US010791198B2

(12) United States Patent
Mizuki et al.

(10) Patent No.: US 10,791,198 B2
(45) Date of Patent: Sep. 29, 2020

(54) INFORMATION PROCESSING SYSTEM, STORAGE MEDIUM HAVING STORED THEREIN INFORMATION PROCESSING PROGRAM, INFORMATION PROCESSING APPARATUS, AND INFORMATION PROCESSING METHOD

(71) Applicant: NINTENDO CO., LTD., Kyoto (JP)

(72) Inventors: Kiyoshi Mizuki, Kyoto (JP); Takao Ohara, Kyoto (JP); Kuniharu Fujikawa, Kyoto (JP); Hisashi Koyama, Kyoto (JP); Takeshi Shimada, Kyoto (JP); Yutaka Takehisa, Kyoto (JP); Yusuke Beppu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 874 days.

(21) Appl. No.: 13/655,197

(22) Filed: Oct. 18, 2012

(65) Prior Publication Data

US 2013/0103748 A1   Apr. 25, 2013

(30) Foreign Application Priority Data

Oct. 19, 2011   (JP) .................................. 2011-229401

(51) Int. Cl.
*H04L 29/06* (2006.01)
*G06Q 10/06* (2012.01)
*G06Q 10/10* (2012.01)

(52) U.S. Cl.
CPC ............. *H04L 67/42* (2013.01); *G06Q 10/06* (2013.01); *G06Q 10/10* (2013.01)

(58) Field of Classification Search
CPC ......... H04L 29/06; G01C 21/00; G06F 15/16; G06F 21/00; G06F 21/62; G06F 9/44; G06Q 30/00; G06Q 50/00

(Continued)

(56) References Cited

U.S. PATENT DOCUMENTS 6,073,242 A * 6/2000 Hardy et al. ...................... 726/1
6,755,743 B1 * 6/2004 Yamashita ............ A63F 13/005
463/42

(Continued)

FOREIGN PATENT DOCUMENTS

JP    2000 157724 A    6/2000
JP    2002 24452       8/2002

(Continued)

OTHER PUBLICATIONS

Japanese Notice of Reasons for Refusal dated Oct. 26, 2016 JP Application No. 2012-207096.

(Continued)

*Primary Examiner* — Kevin T Bates
*Assistant Examiner* — Ronak Patel
(74) *Attorney, Agent, or Firm* — Nixon & Vanderhye, P.C.

(57) ABSTRACT

In an example information processing system including a server and at least one apparatus capable of communicating with the server, the apparatus includes at least an application execution unit. The application execution unit executes a predetermined application. The system includes, by either one of the apparatus and the server or by a cooperation of the apparatus and the server, an execution state determination unit and a writing management unit. The execution state determination unit determines whether or not a state of the execution performed by the application execution unit has satisfied a predetermined condition. The writing management unit, when the state has satisfied the predetermined condition, permits a user of the apparatus to write in information managed by the server.

19 Claims, 10 Drawing Sheets

(58) Field of Classification Search
USPC .......................................................... 709/203
See application file for complete search history.

(56) References Cited

U.S. PATENT DOCUMENTS

| | | | | |
|---|---|---|---|---|
| 7,731,591 | B2* | 6/2010 | Yamada | A63F 13/10 345/505 |
| 2003/0222797 | A1* | 12/2003 | Futa | G01C 21/26 340/995.18 |
| 2006/0059567 | A1* | 3/2006 | Bird et al. | 726/27 |
| 2006/0080702 | A1* | 4/2006 | Diez | A63F 13/12 725/30 |
| 2006/0242065 | A1 | 10/2006 | Jogand-Coulomb et al. | |
| 2007/0162459 | A1* | 7/2007 | Desai | G06F 17/30864 |
| 2007/0173323 | A1* | 7/2007 | Johnson | A63F 13/12 463/42 |
| 2007/0265972 | A1* | 11/2007 | Tsutsui | G06Q 30/06 705/52 |
| 2008/0119281 | A1* | 5/2008 | Hirose | A63F 13/12 463/42 |
| 2009/0070412 | A1* | 3/2009 | D'Angelo | G06Q 10/10 709/203 |
| 2009/0094331 | A1 | 4/2009 | Nobori et al. | |
| 2009/0113560 | A1 | 4/2009 | Kori et al. | |
| 2009/0205020 | A1* | 8/2009 | Kazama et al. | 726/4 |
| 2010/0037288 | A1* | 2/2010 | Carraher | G06F 21/31 726/1 |
| 2010/0042511 | A1* | 2/2010 | Sundaresan | G06Q 10/10 705/26.1 |
| 2010/0153290 | A1* | 6/2010 | Duggan | G06Q 30/08 705/321 |
| 2010/0274858 | A1* | 10/2010 | Lindberg | G06F 3/0481 709/206 |
| 2010/0306122 | A1* | 12/2010 | Shaffer | G06Q 99/00 705/319 |
| 2011/0053673 | A1* | 3/2011 | Hardy | G07F 17/3239 463/17 |
| 2012/0052957 | A1* | 3/2012 | Yokoyama | A63F 13/12 463/42 |
| 2012/0064969 | A1* | 3/2012 | Uchibori | A63F 13/335 463/29 |
| 2012/0122566 | A1* | 5/2012 | Bhogal | G08B 21/02 463/29 |
| 2012/0166560 | A1* | 6/2012 | Nobori et al. | 709/206 |
| 2013/0084998 | A1* | 4/2013 | Frady | G07F 17/3202 463/43 |
| 2014/0115698 | A1* | 4/2014 | Jogand-Coulomb et al. | 726/21 |

FOREIGN PATENT DOCUMENTS

| | | |
|---|---|---|
| JP | 2002-236778 | 8/2002 |
| JP | 2002224452 * | 8/2002 |
| JP | 2007-102484 | 4/2007 |
| JP | 2007-148896 | 6/2007 |
| JP | 2010 035968 A | 2/2010 |
| JP | 2010-046159 | 3/2010 |
| JP | 2010 517186 A | 5/2010 |
| JP | 2010-122783 | 6/2010 |

OTHER PUBLICATIONS

Silver RaiN Official Guidebook, Tommy Walker Co., May 9, 2008, first edition, p. 29 with English translation.
Office Action receive in corresponding Japanese Patent Application No. 2012-207096 dated Nov. 6, 2017.
Matsuo, Market Trend: Web Filtering Software, Nikkei System Provider, Japan, Nikkei Business Publications, Inc., Nov. 22, 2002, No. 165, pp. 60-63 with partial English translation.
Office Action in related EPO Application No. 12 189 232.7-1217 dated Jul. 26, 2018.

\* cited by examiner

F I G. 7
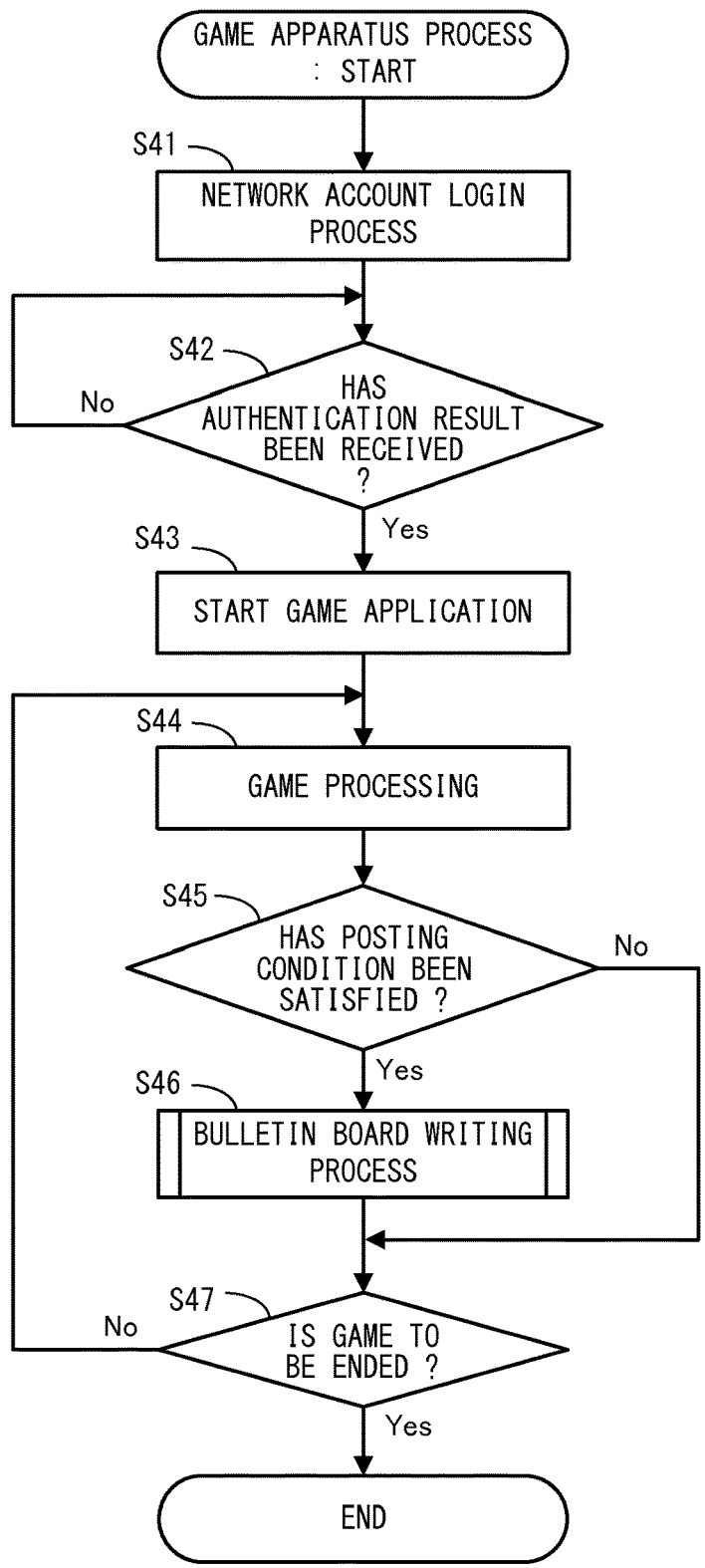

INFORMATION PROCESSING SYSTEM, STORAGE MEDIUM HAVING STORED THEREIN INFORMATION PROCESSING PROGRAM, INFORMATION PROCESSING APPARATUS, AND INFORMATION PROCESSING METHOD

CROSS REFERENCE TO RELATED APPLICATION

The disclosure of Japanese Patent Application No. 2011-229401, filed on Oct. 19, 2011, is incorporated herein by reference.

FIELD

The technology shown here relates to an information processing system, an information processing apparatus, an information processing method, and a storage medium having stored therein an information processing program, and in particular, relates to an information processing system, an information processing apparatus, and an information processing method that, for example, control whether or not it is allowed to access another apparatus, and a storage medium having stored therein an information processing program that, for example, controls whether or not it is allowed to access another apparatus.

BACKGROUND AND SUMMARY

Conventionally, a system is known where a user writes on and/or reads a bulletin board or the like for exchanging information. In such a system, the user can post information and browse information posted by another user.

However, in the system where it is allowed to freely write on and/or read the bulletin board or the like, the posting and/or browsing of information is not restricted. Thus, the user can freely post information regarding an application, which may lower the credibility of the posted information regarding the application.

Therefore, it is an object of an exemplary embodiment to provide an information processing system, an information processing apparatus, and an information processing method that are capable of improving the credibility of information written in a server, and a storage medium having stored therein an information processing program capable of improving the credibility of information written in a server.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of an information processing system according to the exemplary embodiment is an information processing system including a server and at least one apparatus capable of communicating with the server. The apparatus includes at least an application execution unit. The application execution unit executes a predetermined application. The system includes, by either one of the apparatus and the server or by a cooperation of the apparatus and the server, an execution state determination unit and a writing management unit. The execution state determination unit determines whether or not a state of the execution performed by the application execution unit has satisfied a predetermined condition. The writing management unit, when the state has satisfied the predetermined condition, permits a user of the apparatus to write in information managed by the server.

On the basis of the above, only a user having executed an application to reach a predetermined state is allowed to write in information managed by a server. This prevents a user not having executed the application to reach the predetermined state from writing, which results in improving the credibility of information written in the server.

In addition, the apparatus may include the execution state determination unit and the writing management unit.

On the basis of the above, it is possible to manage, with the design of an application to be executed by an apparatus that communicates with the server, whether or not it is allowed to write in the server. This makes it possible to design an application to be executed by the apparatus without taking into account the settings of the server, which makes it possible to improve the degree of freedom in design.

In addition, the apparatus may further include an input information transmission unit. The input information transmission unit, when the writing management unit has permitted the writing, transmits input information input by the permitted user to the server. In addition, the server may further include an information update unit. The information update unit, when having received the input information from the apparatus, updates the information managed by the server, using the received input information.

On the basis of the above, a user permitted to write can easily transmit input information for writing in the server, using the apparatus with which the user has been permitted to write, and can update the information managed by the server, using the input information.

In addition, the apparatus may further include an identification information management unit. The identification information management unit manages at least one piece of identification information of the server. In this case, when the state has satisfied the predetermined condition, the writing management unit may permit the user to write in the information corresponding to the piece of identification information. When the writing has been permitted, the input information transmission unit may transmit the input information input by the user to the server, using the piece of identification information.

In addition, the application may hold the piece of identification information for writing information regarding the application in the information managed by the server. In this case, the identification information management unit may manage the piece of identification information held by the application.

On the basis of the above, in the information processing system, a piece of identification information on the basis of which it is allowed to write in the server is held in advance by the apparatus. Then, only the apparatus manages the piece of identification information, whereby it is allowed to write in the server only when the apparatus permits writing, and another apparatus cannot allow writing in the server. That is, the server does not need to determine whether or not it is allowed to write, and it is possible to manage, only with the design of an application to be executed by the apparatus, whether or not it is allowed to write. This makes it possible to design an application to be executed by the apparatus, without taking into account the settings of the server, which makes it possible to improve the degree of freedom in design.

In addition, the server may provide as the information a plurality of services on which to write. In this case, the identification information management unit may manage the pieces of identification information corresponding to the respective services. The execution state determination unit may determine whether or not the state has satisfied each of a plurality of conditions. The writing management unit may permit the user to write in the service corresponding to the condition satisfied by the state. The input information transmission unit may transmit the input information to the server, using the piece of identification information corresponding to the service on which the user has been permitted to write. The information update unit may update the information of the service corresponding to the piece of identification information related to the input information, using the input information received from the apparatus.

On the basis of the above, it is possible to set a plurality of pieces of identification information for one application to be executed by the apparatus. This makes it possible to set separate services on which it is allowed to write, and also makes it possible to further improve the degree of freedom in designing the application. Further, the variety of the services makes it possible to motivate a user to execute the application.

In addition, the apparatus may further include a user management unit. The user management unit manages a unique code for identifying the user who uses the apparatus. In this case, when the state has satisfied the predetermined condition, the writing management unit may permit the user having satisfied the predetermined condition to write in the information using the code. When the writing has been permitted, the input information transmission unit may transmit the code to the server. The server may further include a writing user management unit. The writing user management unit manages, using the code, a user to be permitted to write in the information. When the information update unit has received the code from the apparatus or another apparatus and the received code is included in codes managed by the writing user management unit for permitting writing, the information update unit may update the information managed by the server, using the input information input by the user identified by the received code.

On the basis of the above, the server prohibits a user not permitted to write from writing, but allows a user once identified by a code transmitted from the apparatus to write. Thus, a user whose permission to write has once been registered is allowed to write in the server even using another apparatus.

In addition, the execution state determination unit may determine whether or not the state has satisfied the predetermined condition while the application execution unit is executing the application, and, when having determined that the state has satisfied the predetermined condition, may save determination data representing the determination result. In this case, when the determination data has been saved at a predetermined time, the writing management unit may permit the user of the apparatus to write in the information managed by the server.

On the basis of the above, determination data is set by, during the application, repeatedly determining whether or not it is allowed to write in the server. This makes it difficult to be permitted to write in the server by unfair means without executing the application.

In addition, the writing management unit may include a notification unit. The notification unit notifies the user of the apparatus that the writing has been permitted at the predetermined time.

On the basis of the above, the user can know that they have been permitted at a predetermined time to write in the server.

In addition, the server may provide as the information a plurality of services on which to write. In this case, the apparatus may further include an identification information management unit and a user management unit. The identification information management unit manages a plurality of pieces of identification information corresponding to the respective services of the server. The user management unit manages a unique code for identifying the user who uses the apparatus. The execution state determination unit may determine whether or not the state has satisfied each of a plurality of conditions. The writing management unit may permit, in the service corresponding to the condition satisfied by the state, the user having satisfied the condition to write using the code. When the writing has been permitted, the input information transmission unit may transmit to the server the piece of identification information corresponding to the service on which the user has been permitted to write and the code. The server may further include a writing user management unit. The writing user management unit, when having received the piece of identification information and the code, manages, using the received code, a user to be permitted to write in each of the services, such that the user identified by the received code is the user to be permitted to write in the service corresponding to the received piece of identification information. When the information update unit has received the code from the apparatus or another apparatus and the received code is included in codes managed by the writing user management unit for permitting writing in any of the services, the information update unit may update the information of the service, using the input information input to write in the service by the user identified by the received code.

On the basis of the above, it is possible to manage the users to be allowed to write in each of the services provided by the server, by distinguishing them.

In addition, the server may further include a disclosure information management unit. The disclosure information management unit discloses, to the user permitted by the writing management unit to write, the information in which the user has been permitted to write.

On the basis of the above, users having satisfied a predetermined state can exchange information via the server.

In addition, the information processing system may further include a particular user management unit. The particular user management unit manages a particular user having a particular relationship with the user. In this case, the server may further include a disclosure information management unit. The disclosure information management unit, when a request has been made for disclosure of the information managed by the server, discloses, to the user having made the request, input information written by the particular user set for the user having made the request.

On the basis of the above, particular users having a particular relationship with the user can exchange information via the server.

In addition, the input information transmission unit may transmit to the server the input information together with state information indicating the state of the execution performed by the application execution unit. When having received the input information from the apparatus, the information update unit may update the information managed by the server, using both the input information and the state information, and may add both the input information and the state information to information to be disclosed to the apparatus and another apparatus.

On the basis of the above, on the basis of data representing the execution state of the application and transmitted from a writing source, the server can write input information together with the execution state transmitted with the input information, for disclosure. Thus, not only does the information written in the server ensure that a writing condition is satisfied, the information also discloses the execution state exceeding the writing condition. This makes it possible to further improve the credibility of information written in the server.

In addition, the other apparatus may include an apparatus of the same type as the apparatus having executed the application, and may also include an apparatus of a different type from the apparatus having executed the application.

On the basis of the above, the user can access the server using not only the apparatus having executed the application, but also another apparatus of the same type as the apparatus or another apparatus of a different type from the apparatus.

In addition, the information processing system may further include an account authentication unit. The account authentication unit, using a character string for identifying the user and a password input by the user, authenticates an account for communicating with the server. In this case, when the state of the execution of the application performed by the user for which the account is authenticated has satisfied the predetermined condition, the writing management unit permits the user to write.

On the basis of the above, a character string and a password for identifying the user are used for authenticating an account, which enhances the security of the communication between the apparatus and the server.

In addition, the application execution unit may execute a game application. When a predetermined game has been completed in the game application executed by the application execution unit, the execution state determination unit may determine that the state has satisfied the predetermined condition.

On the basis of the above, only a user having completed a game is allowed to write in the information managed by the server, which prevents a user not having completed the game from writing. This results in improving the credibility of information regarding the game written in the server.

In addition, the exemplary embodiment may be carried out in the forms of a storage medium having stored therein an information processing program that causes a computer to execute the operations of the above units, an information processing apparatus including at least some of the above units, and an information processing method including the operations performed by the above units.

The exemplary embodiment makes it possible to improve the credibility of information written in a server.

These and other objects, features, aspects and advantages of the exemplary embodiment will become more apparent from the following detailed description of the exemplary embodiment when taken in conjunction with the accompanying drawings.

BRIEF DESCRIPTION OF THE DRAWINGS

FIG. 7 is a flow chart showing a non-limiting example of the processing performed when credentials for access are acquired using the game apparatus 3;

DETAILED DESCRIPTION OF NON-LIMITING EXAMPLE EMBODIMENTS

Figure 1:
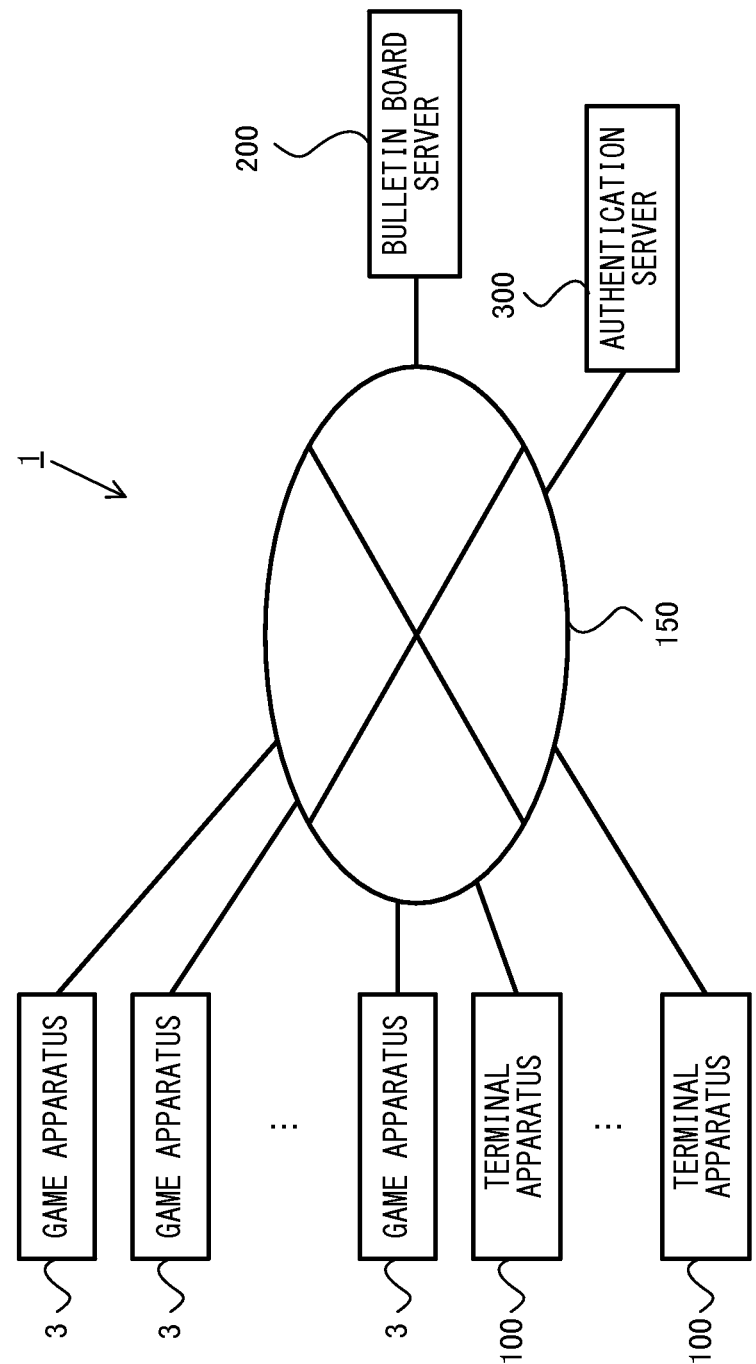
FIG. 1 is an external view of a non-limiting example of an information processing system 1.

With reference to FIG. 1, an information processing system according to an exemplary embodiment is described. As shown in FIG. 1, an information processing system 1, which is an example of the information processing system, is constructed by the connection between a plurality of game apparatuses 3, a plurality of terminal apparatuses 100, a bulletin board server 200, and an authentication server 300 via a network 150.

Each game apparatus 3 executes an application that proceeds in a predetermined order, such as a game, and the game apparatus 3 is configured to be connected to the network 150 using wireless or wired communication. Then, the game apparatus 3 can communicate with the bulletin board server 200 by establishing connection with the bulletin board server 200 via the network 150. For example, the game apparatus 3 may be a stationary game system including: an optical disk having stored therein a program (for example, a game program), which is an example of an information processing program; a game apparatus body having a computer for executing the program stored in the optical disk to output a game screen to a monitor for display; and a controller for giving operation information to the game apparatus body, the operation information being necessary for operating an object or the like displayed on a display screen. Alternatively, the game apparatus 3 may be a handheld game apparatus, or may be a device such as a general personal computer, a mobile phone, or a PDA (Personal Digital Assistant).

Each terminal apparatus 100 is a general information processing apparatus, and is formed, for example, of a device such as a general personal computer, a mobile phone, a PDA, a handheld game apparatus, or a stationary game apparatus. The terminal apparatus 100 can also communicate with the bulletin board server 200 by establishing connection with the bulletin board server 200 via the network 150.

The authentication server 300 is used to, when an attempt has been made to log in to the network 150 using the game apparatus 3 or the terminal apparatus 100, determine whether or not the user having attempted to log in is an authorized user. For example, the authentication server 300 manages the user IDs and the passwords of users of the network 150, and authenticates a user having attempted to log in, using data of their ID and password. Further, the authentication server 300 communicates with the bulletin board server 200 using a predetermined protocol, so that, if the bulletin board server 200 makes a request for confirmation that the user is authenticated, the authentication server 300 gives a response to the request.

Figure 2:
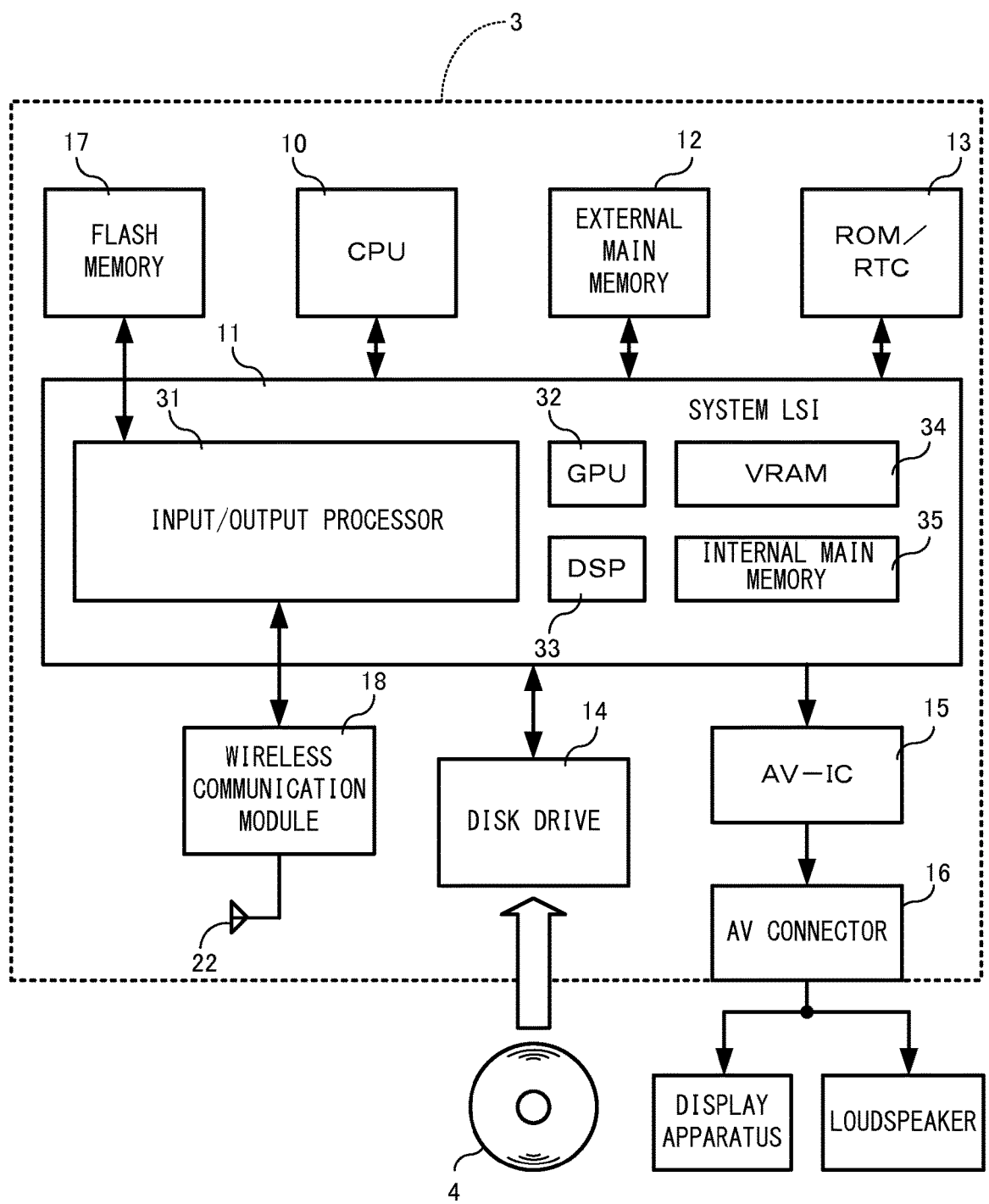
FIG. 2 is a block diagram showing a non-limiting example of the configuration of a game apparatus 3 in FIG. 1.

Next, with reference to FIG. 2, the game apparatus 3 is described. It should be noted that FIG. 2 is a block diagram showing an example of the configuration of the game apparatus 3.

In FIG. 2, an optical disk 4, which is an example of an information storage medium used in the game apparatus 3 in an exchangeable manner, is attached to or detached from the game apparatus 3. Further, the game apparatus 3 has a flash memory 17 that functions as a backup memory having fixedly stored therein data such as saved data. The game apparatus 3 executes a game program or the like stored in the optical disk 4, thereby displaying the execution result as a game image on a display apparatus. The game program or the like to be executed may be not only stored in the optical disk 4 but also stored in advance in the flash memory 17. Further, the game apparatus 3 can also reproduce the state of a game executed in the past, using saved data stored in the flash memory 17, thereby displaying a game image on the display apparatus. Then, the user of the game apparatus 3 can enjoy the progression of a game by operating the game apparatus 3 while viewing a game image displayed on the display apparatus.

The game apparatus 3 includes a CPU (Central Processing Unit) 10, a system LSI (Large Scale Integration) 11, an external main memory 12, a ROM/RTC (Read Only Memory/Real Time Clock) 13, a disk drive 14, an AV-IC (Audio Video-Integrated Circuit) 15, and the like.

The CPU 10 performs processing by executing a program stored in the optical disk 4, and functions as a game processor. The CPU 10 is connected to the system LSI 11. The system LSI 11 is connected to the external main memory 12, the ROM/RTC 13, the disk drive 14, and the AV-IC 15, as well as the CPU 10. The system LSI 11 performs the process of controlling data transmission between the components connected to the system LSI 11; the process of generating an image to be displayed; the process of acquiring data from an external apparatus; and the like. It should be noted that the internal configuration of the system LSI 11 will be described later. The volatile external main memory 12 stores a program read from the optical disk 4 or a program read from the flash memory 17, and also stores various data. The external main memory 12 is used as a work area and a buffer area of the CPU 10. The ROM/RTC 13 has a ROM in which a program for starting the game apparatus 3 is incorporated (a so-called boot ROM), and a real-time clock (RTC) that counts time. The disk drive 14 reads program data, texture data, and the like from the optical disk 4, and writes the read data to an internal main memory 35 described later or the external main memory 12.

The system LSI 11 includes an input/output processor 31, a GPU (Graphics Processor Unit) 32, a DSP (Digital Signal Processor) 33, a VRAM (Video RAM) 34, and an internal main memory 35. Although not shown in the figures, these components 31 through 35 are connected together via an internal bus.

The GPU 32 forms a part of drawing means, and generates an image in accordance with a graphics command (an instruction to create an image) from the CPU 10. The VRAM 34 stores data necessary for the GPU 32 to execute the graphics command (data such as polygon data and texture data). To generate an image, the GPU 32 creates image data using the data stored in the VRAM 34.

The DSP 33 functions as an audio processor, and generates audio data using sound data and audio waveform (timbre) data that are stored in the internal main memory 35 or the external main memory 12.

The image data and the audio data generated as described above are read by the AV-IC 15. The AV-IC 15 outputs the read image data to the display apparatus via the AV connector 16, and also outputs the read audio data to a loudspeaker. This causes an image to be displayed on the display apparatus, and also causes sound to be output from the loudspeaker.

The input/output processor (I/O processor) 31, for example, transmits and receives data to and from the components connected to the I/O processor 31, and downloads data from an external apparatus. The input/output processor 31 is connected to the flash memory 17, a wireless communication module 18, and the like. The wireless communication module 18 is connected to an antenna 22.

The input/output processor 31 is connected to a network (for example, the network 150) via the wireless communication module 18 and the antenna 22, and thereby can communicate with other game apparatuses and various servers (for example, the bulletin board server 200) that are connected to the network. The input/output processor 31 periodically accesses the flash memory 17, and detects the presence or absence of data that needs to be transmitted to the network. If such data is present, the input/output processor 31 transmits the data to the network via the wireless communication module 18 and the antenna 22. Further, the input/output processor 31 receives, via the network, the antenna 22, and the wireless communication module 18, data transmitted from other game apparatuses and data downloaded from a download server, and stores the received data in the flash memory 17. The CPU 10 executes a program, thereby reading data stored in the flash memory 17 to use it in the program. The flash memory 17 may store saved data (process result data or in-process data) obtained in a game played using the game apparatus 3, as well as data transmitted and received between the game apparatus 3, and other game apparatuses and various servers. It should be noted that, similarly to the external main memory 12, the internal main memory 35 may store a program read from the optical disk 4 or a program read from the flash memory 17, and may also store various data. Further, the internal main memory 35 may be used as a work area and a buffer area of the CPU 10.

Figure 3:
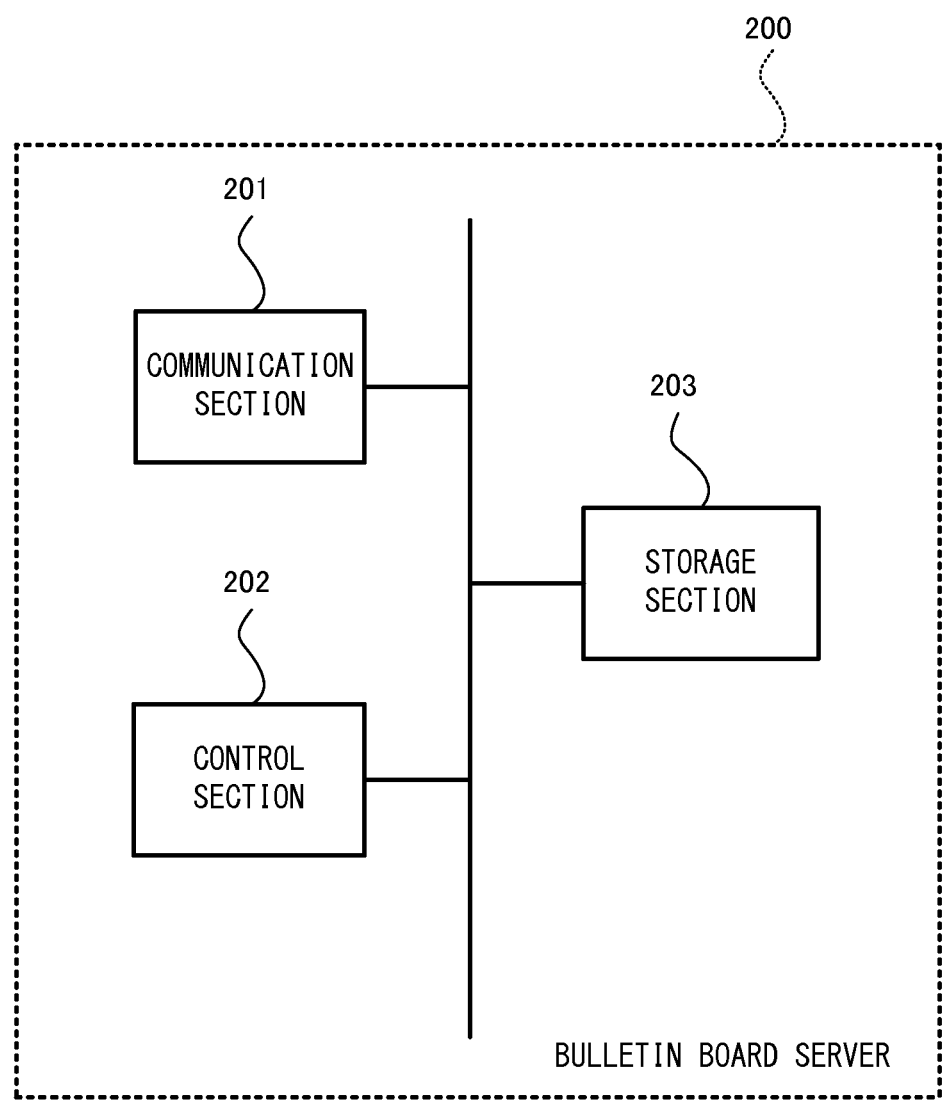
FIG. 3 is a block diagram showing a non-limiting example of the configuration of a bulletin board server 200 in FIG. 1.

Next, with reference to FIG. 3, the bulletin board server 200 is described. It should be noted that FIG. 3 is a block diagram showing an example of the configuration of the bulletin board server 200.

The bulletin board server 200 includes a communication section 201, a control section 202, and a storage section 203. The communication section 201 transmits and receives communication packets, thereby communicating with the game apparatus 3 via the network 150. The control section 202, for example, performs the process of writing on and/or reading (posting and/or browsing information on) a bulletin board or the like, and also establishes communication links to the game apparatus 3 or the terminal apparatus 100 via the communication section 201, thereby controlling data transmission and selecting a path in the network 150. The storage section 203 stores a program to be executed by the control section 202, and various data necessary for communication with the game apparatus 3 or the terminal apparatus 100. It should be noted that the bulletin board server 200 may be formed of a single server machine, or may be formed of a plurality of server machines. Further, in the illustration of FIG. 1, the bulletin board server 200 and the authentication server 300 are formed of different server machines. Alternatively, the functions of these servers may be achieved by a single server machine.

Figure 4:
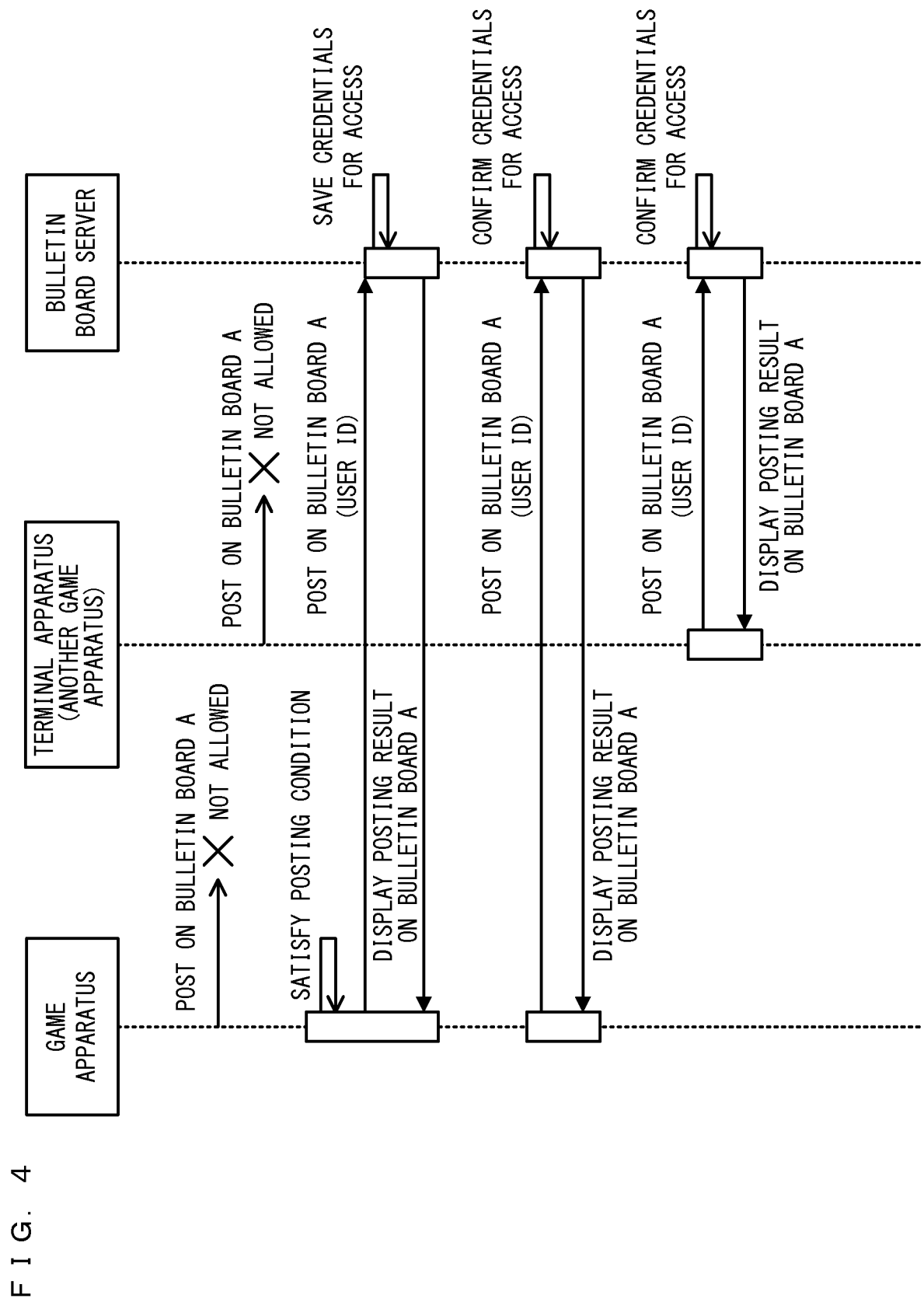
FIG. 4 is a chronological diagram showing a non-limiting example of the interactions between apparatuses of the information processing system 1 in FIG. 1.

Next, with reference to FIG. 4, a description is given of an overview of the processing performed by the information processing system 1, before the descriptions of specific processing performed by the game apparatus 3 and the bulletin board server 200. It should be noted that FIG. 4 is a chronological diagram showing an example of the interactions between apparatuses of the information processing system 1. Here, the bulletin board server 200 provides a plurality of bulletin board services that it is allowed to post on/browse using the game apparatus 3 and the terminal apparatus 100. With reference to FIG. 4, a description is given of an example of the process of allowing posting (writing) on a bulletin board A among the plurality of bulletin board services provided by the bulletin board server 200.

In FIG. 4, the bulletin board server 200 sets credentials for access for each of the bulletin board services provided by the bulletin board server 200, in order to limit the users to be allowed to post (write) on the bulletin board service. For example, if a user attempts to post on any one of the bulletin board services (for example, the bulletin board A) of the bulletin board server 200 using the game apparatus 3 or the terminal apparatus 100 when having no credentials for access to the bulletin board service, the user cannot post on the bulletin board service.

If, on the other hand, the state of the execution of a predetermined application using the game apparatus 3 has satisfied a predetermined posting condition, a user having performed this execution is allowed to post on the bulletin board A regarding the predetermined application. For example, if a game is executed, examples of the posting condition may include: the completion of the game; the fact that the game playing time reaches a predetermined time; the fact that the number of times the game has been played reaches a predetermined number of times; defeating a predetermined number of enemies appearing in the game; defeating a predetermined enemy appearing in the game; the occurrence of a predetermined event during the game; winning or losing a predetermined number of times in the game; and the actual execution of the game. Alternatively, if the process of reproducing a moving image is executed, examples of the posting condition may include: the reproduction of the moving image to the end; the fact that the reproduction time of the moving image reaches a predetermined time; and the actual reproduction of the moving image. Yet alternatively, if the process of displaying a still image (an electronic book, a cooking recipe, or the like) is executed, examples of the posting condition may include: the display of still images to a predetermined page; the display of a predetermined still image; and the actual display of the still image. If the posting condition has been satisfied and posting is made on the bulletin board A, the game apparatus 3 extracts a piece of identification information of the bulletin board A from pieces of identification information of the respective bulletin board services (for example, the bulletin board IDs and the URLs (Uniform Resource Locators) of the respective bulletin boards) managed in advance, and accesses the bulletin board server 200 using the extracted piece of identification information. Typically, the pieces of identification information of the respective bulletin board services are included in advance in the application for which it is determined whether or not the posting condition has been satisfied using the game apparatus 3. Consequently, the pieces of identification information for accessing and writing in the server are included in the application on the basis of which the access is allowed. This makes it possible to manage the type of a posting service (an access target) only with the design of the application to be executed by the game apparatus 3. It should be noted that the following descriptions are given using an example where the posting condition is satisfied by executing a game, and it is allowed to write on a bulletin board regarding the game.

If the user has satisfied the posting condition using the game apparatus 3 and then accessed the bulletin board A via the network 150 to post (write) posting information on the bulletin board A using the game apparatus 3, the bulletin board server 200 saves the credentials for access of the user on the basis of the user ID of the user having accessed the bulletin board A to post the posting information. Then, the bulletin board server 200 writes the posted posting information on the bulletin board A, and updates the posting information of the bulletin board A. This makes it possible to, using the game apparatus 3, browse the bulletin board A reflecting the result of the posting. Here, the user ID may only need to be a unique code that enables the identification of the user, and may be, for example, an account ID, which is a character string serving as an indicator for the identification of the user.

In addition, the user whose credentials for access described above have been saved is allowed to post on the bulletin board A even using an apparatus (for example, the terminal apparatus 100 or another game apparatus 3) different from the game apparatus 3 with which the user has been allowed to post. For example, if an attempt has been made to access the bulletin board A using the terminal apparatus 100, the bulletin board server 200 confirms whether or not the user ID of the user having attempted to access the bulletin board A has credentials for access. If the determination is affirmative, the bulletin board server 200 allows the access, then writes the posting information posted by the user on the bulletin board A, and updates the posting information of the bulletin board A. This makes it possible to post on the bulletin board A using the terminal apparatus 100, and makes it possible to, also using the terminal apparatus 100, browse the bulletin board A reflecting the result of the posting.

Figure 5:
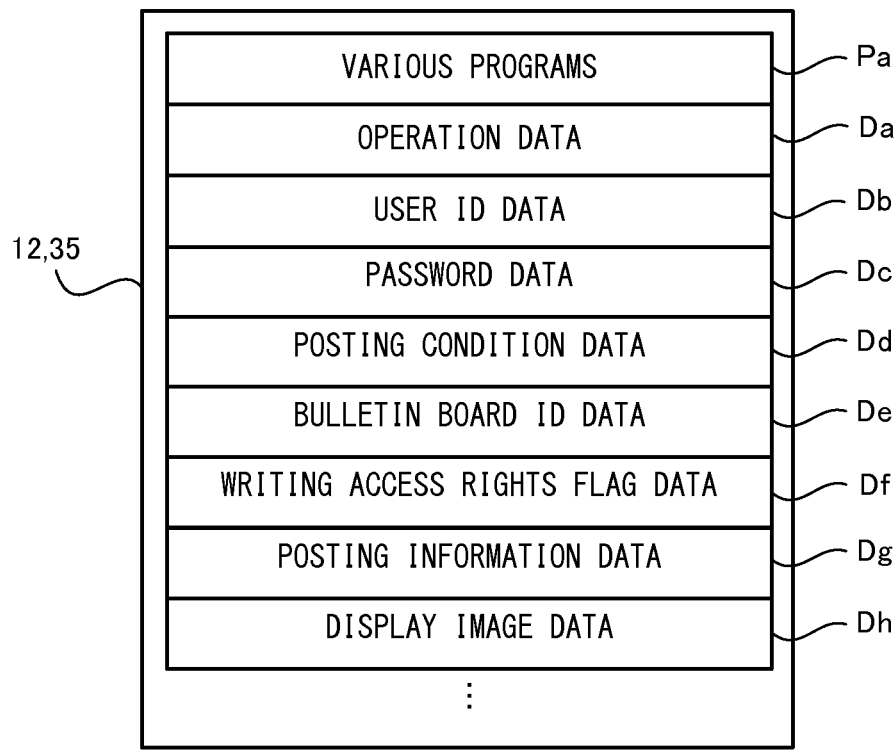
FIG. 5 is a diagram showing non-limiting examples of main data and programs stored in a main memory of the game apparatus 3.

Next, a detailed description is given of the processing performed by the information processing system 1. First, with reference to FIGS. 5 and 6, main data used in the processing is described. It should be noted that FIG. 5 is a diagram showing examples of main data and programs stored in the external main memory 12 and/or the internal main memory 35 (hereinafter, these two main memories are collectively referred to simply as a "main memory") of the game apparatus 3. FIG. is a diagram showing examples of main data and programs stored in the storage section 203 of the bulletin board server 200.

As shown in FIG. 5, the following are stored in the data storage area of the main memory: operation data Da; user ID data Db; password data Dc; posting condition data Dd; bulletin board ID data De; writing access rights flag data Df; posting information data Dg; display image data Dh; and the like. It should be noted that the main memory stores, as well as the data included in the information shown in FIG. 5, data and the like necessary for the processing, such as data used in an application to be executed. Further, in the program storage area of the main memory, various programs Pa included in the information processing program are stored.

The operation data Da is data representing operation information of the operation performed on the game apparatus 3 by a user. For example, operation data indicating the operation performed on an operation button or the like is acquired per time unit that the game apparatus 3 performs processing (for example, every 1/60 second), and the operation data is stored and updated in the operation data Da in accordance with the acquisition.

The user ID data Db is data representing a unique code that enables the identification of the user who uses the game apparatus 3, and is data representing, for example, an account ID, which is a character string serving as an indicator for the identification of the user. The password data Dc is data representing a password used to log in to the network 150 using the game apparatus 3.

The posting condition data Dd is data representing the condition under which it is allowed to post on each of the bulletin board services provided by the bulletin board server 200. The posting condition data Dd is indicated by an execution state (the play history, the degree of progression of the play, the execution history, the process history, or the like) of an application executed by the game apparatus 3, on the basis of which it is allowed to post. The bulletin board ID data De is data representing the piece of identification information (the bulletin board ID) of each of the bulletin board services that it is allowed to access when the posting condition has been satisfied. For example, the piece of identification information is included in advance in the application for which it is determined whether or not the posting condition has been satisfied. Then, the piece of identification information is acquired and stored in the bulletin board ID data De after the execution of the application.

The writing access rights flag data Df is data representing a writing access rights flag that is set to on when, in an executed application, it is allowed to write on any of the bulletin boards regarding the application.

The posting information data Dg is data representing the content of the posting written on any of the bulletin board services by the user of the game apparatus 3.

The display image data Dh is data for generating an image in which an object, a character, a background, and the like are placed, and displaying the image on the display apparatus.

Figure 6:
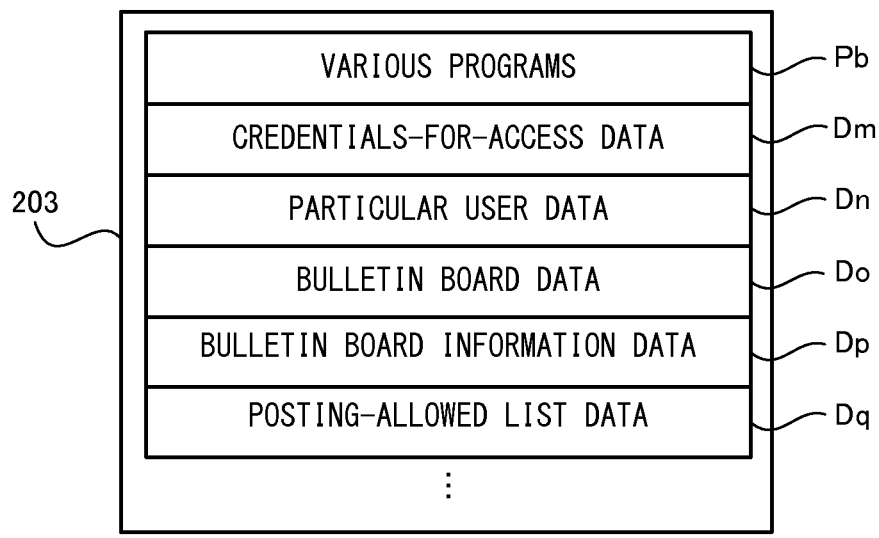
FIG. 6 is a diagram showing non-limiting examples of main data and programs stored in a storage section 203 of the bulletin board server 200.

As shown in FIG. 6, the following are stored in the data storage area of the storage section 203: credentials-for-access data Dm; particular user data Dn; bulletin board data Do; bulletin board information data Dp; posting-allowed list data Dq; and the like. It should be noted that the storage section 203 may store, as well as the data included in the information shown in FIG. 6, data and the like necessary for the process of writing/reading information to be managed by the bulletin board server 200. Further, in the program storage area of the storage section 203, various programs Pb for achieving the above processing are stored.

The credentials-for-access data Dm is data representing the credentials for access of a user to be allowed to write on each of the bulletin board services managed by the bulletin board server 200. For example, a user having credentials for access is managed by the user ID transmitted from the game apparatus 3 when the user has been allowed to post.

The particular user data Dn is data representing a particular user registered for the user accessing the bulletin board server 200. For example, examples of the particular user include: a favorite user set by the user on their own; another user representing a friend associated with the user by the approval of each other; and another user having been operating a character encountered in a virtual world during a game. All of these users may be managed by user IDs for identifying the particular users.

The bulletin board data Do is data representing the bulletin board contents of (the contents of the postings on) each of the bulletin board services managed by the bulletin board server 200. The bulletin board information data Dp is data representing, when a posting request and/or a browsing request has been made via the network 150, bulletin board information that is allowed to be displayed to the request source. The posting-allowed list data Dq is data representing, when a posting request and/or a browsing request has been made, a list of bulletin boards that are allowed to be displayed to the request source.

Figure 8:
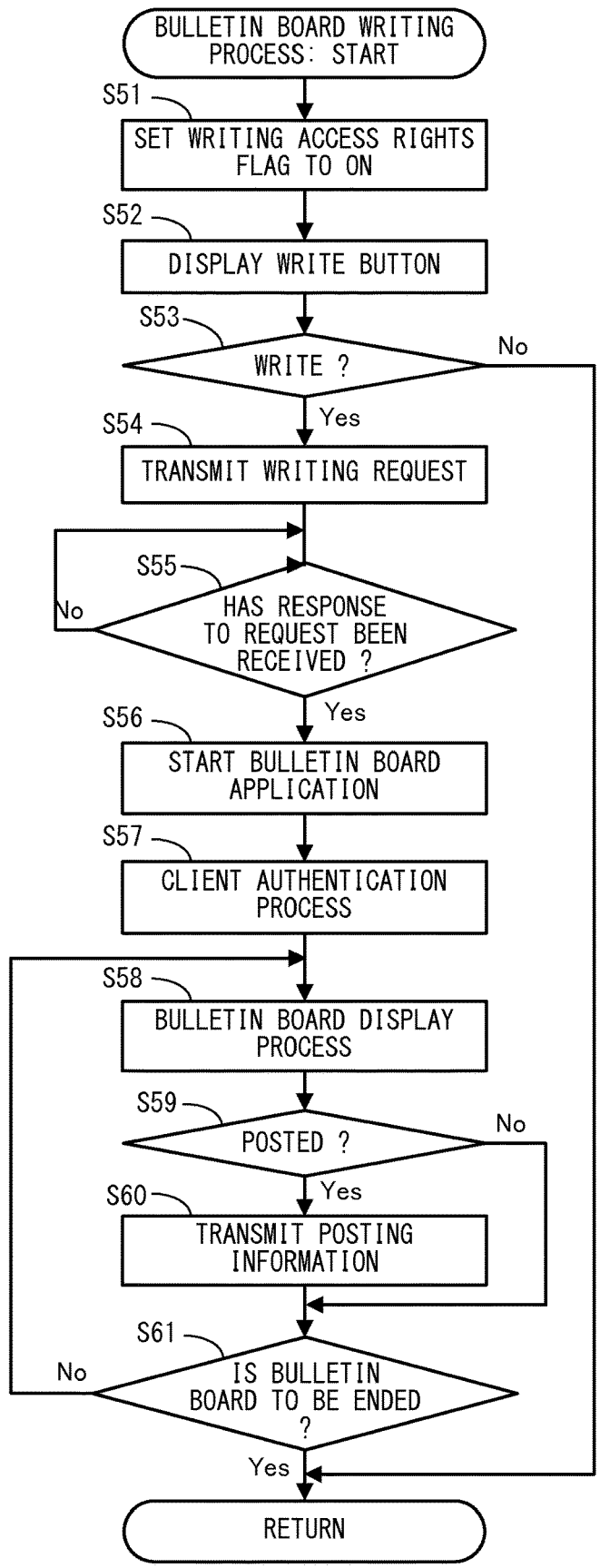
FIG. 8 is a subroutine flow chart showing a non-limiting example of a bulletin board writing process in step 46 of FIG. 7.
Figure 9:
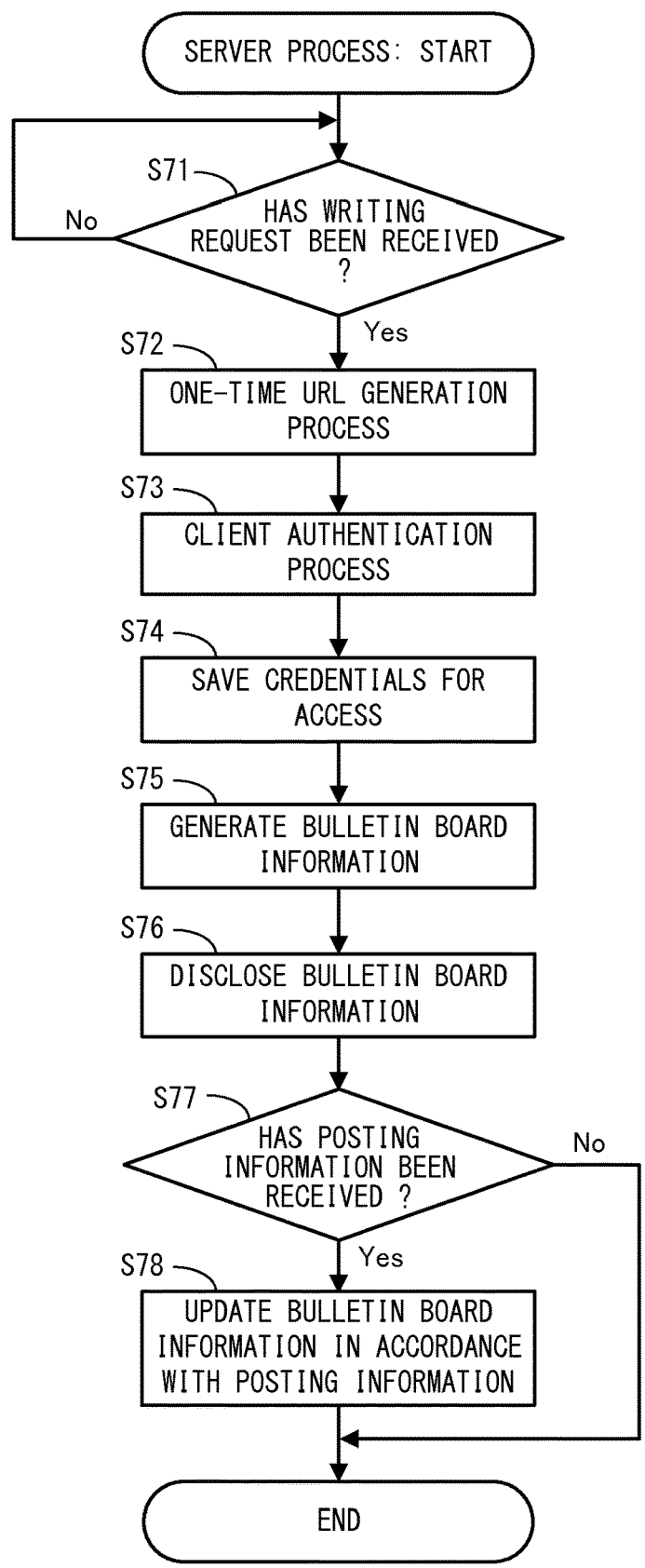
FIG. 9 is a flow chart showing a non-limiting example of the processing performed when credentials for access are set by the bulletin board server 200.
Figure 10:
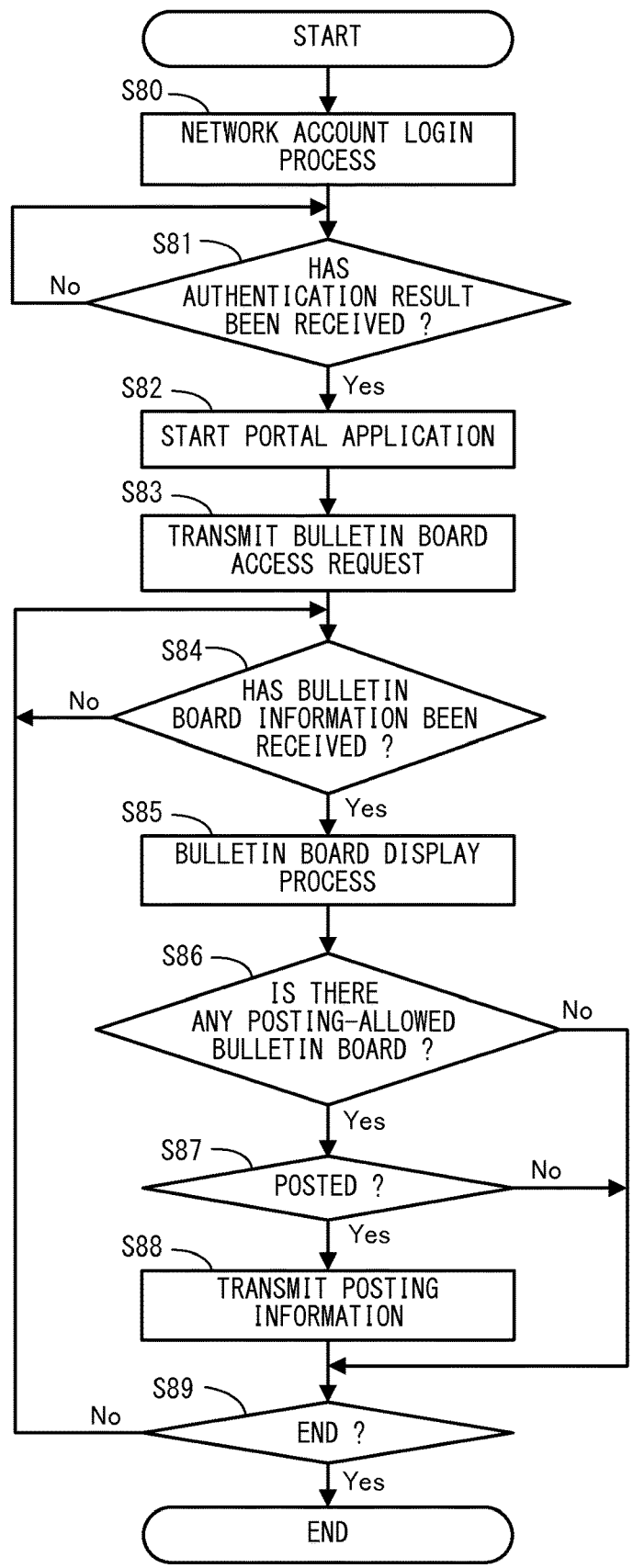
FIG. 10 is a flow chart showing a non-limiting example of the processing performed when a bulletin board managed by the bulletin board server 200 is browsed and/or posting is made on the bulletin board, using the game apparatus 3 or the terminal apparatus 100.
Figure 11:
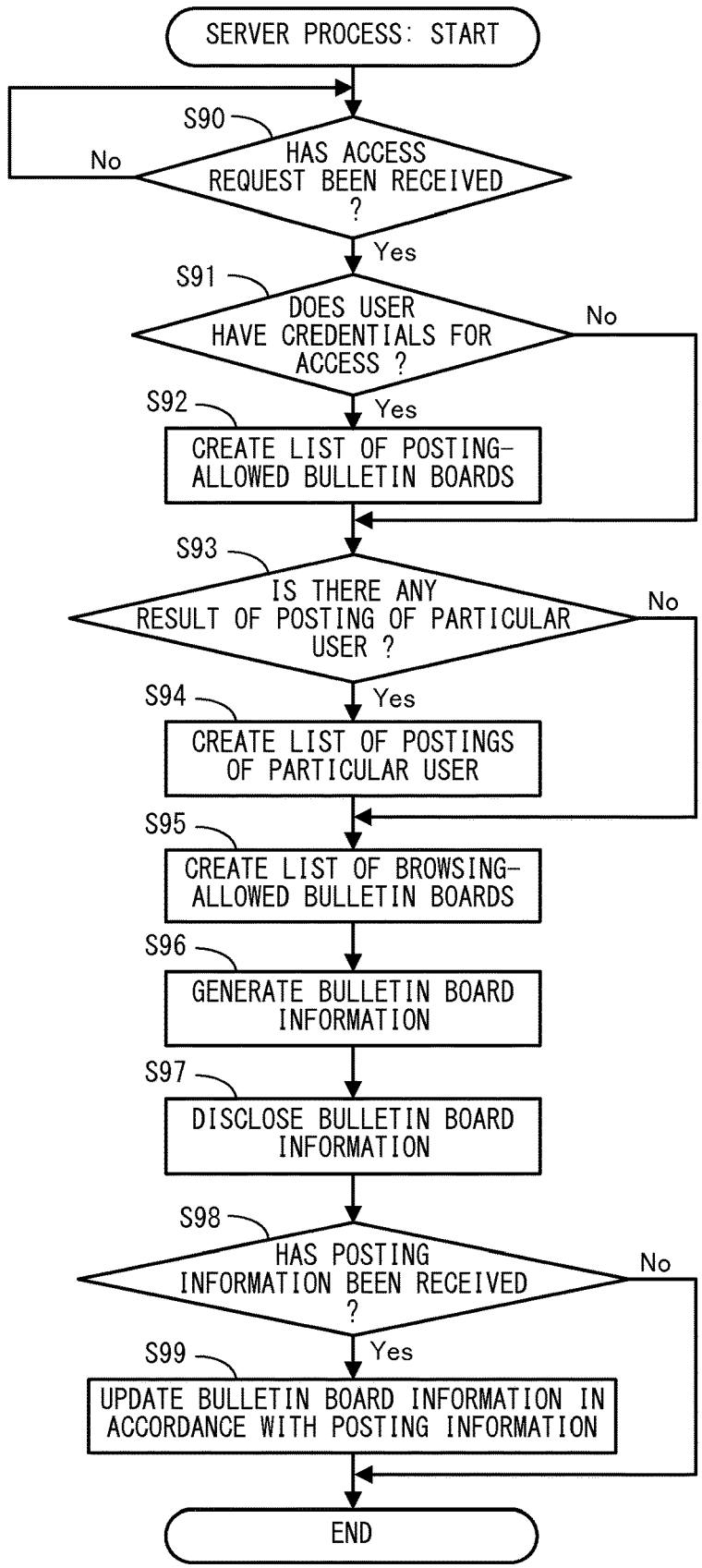
FIG. 11 is a flow chart showing a non-limiting example of the processing performed when the bulletin board server 200 causes the bulletin board to be displayed on the game apparatus 3 or the terminal apparatus 100.

Next, with reference to FIGS. 7 through 11, detailed descriptions are given of the processing performed by the game apparatus 3 and the bulletin board server 200. It should be noted that FIG. 7 is a flow chart showing an example of the processing performed when credentials for access are acquired using the game apparatus 3. FIG. 8 is a subroutine flow chart showing an example of a bulletin board writing process in step 46 of FIG. 7. FIG. 9 is a flow chart showing an example of the processing performed when credentials for access are set by the bulletin board server 200. FIG. 10 is a flow chart showing an example of the processing performed when a bulletin board managed by the bulletin board server 200 is browsed and/or posting is made on the bulletin board, using the game apparatus 3 or the terminal apparatus 100. FIG. 11 is a flow chart showing an example of the processing performed when the bulletin board server 200 causes a bulletin board to be displayed on the game apparatus 3 or the terminal apparatus 100. Here, in the flow charts shown in FIGS. 7 through 11, descriptions are given mainly of, in the processing performed by the information processing system 1, the process of browsing and/or posting on a bulletin board. Detailed descriptions of other processes not directly related to these processes are omitted. Further, in FIGS. 7 through 11, all the steps performed by the CPU 10 are abbreviated as "S".

When the game apparatus 3 is turned on, the CPU 10 of the game apparatus 3 executes the boot program stored in the ROM/RTC 13, thereby initializing each unit such as the main memory. Then, the information processing program stored in the optical disk 4 or the like is loaded into the main memory, and the CPU 10 starts the execution of the information processing program. The flow charts shown in FIGS. 7, 8, and 10 are flow charts showing the processing performed after the above processes completed.

Referring to FIG. 7, the CPU 10 performs the process of logging in to the network 150 (step 41), and proceeds to the subsequent step. For example, the CPU 10 performs the process of logging in to the network 150 using the user ID represented by the user ID data Db and the password represented by the password data Dc. The authentication server 300 connected to the network 150 authenticates the account using the user ID and the password transmitted in the login process, and sends the authentication result to the transmission source (the game apparatus 3).

Next, the CPU 10 waits for the authentication result from the authentication server 300 (step 42). If login rights have been confirmed by the authentication of the account, the CPU 10 proceeds to the subsequent step 43.

In step 43, the CPU 10 starts a game application. Then, the CPU 10 performs game processing on the basis of the started game application (step 44), and proceeds to the subsequent step.

Next, the CPU 10 determines whether or not the execution state of the currently executed game application has satisfied a posting condition determined in advance (step 45). For example, with reference to the posting condition data Dd, the CPU 10 extracts a posting condition set for the currently executed game application, and determines whether or not the current execution state has satisfied the posting condition. It should be noted that a plurality of posting conditions may be set for one application. If a plurality of posting conditions are set for the currently executed game application, in the above step 45, the CPU 10 determines whether or not the current execution state has satisfied any one of the posting conditions. Then, if the current execution state has satisfied the posting condition, the CPU 10 proceeds to the subsequent step 46. If, on the other hand, the current execution state has not satisfied the posting condition, the CPU 10 proceeds to the subsequent step 47.

In step 46, the CPU 10 performs a bulletin board writing process, and proceeds to the subsequent step. With reference to FIG. 8, a description is given below of the bulletin board writing process performed in the above step 46.

Referring to FIG. 8, the CPU 10 sets the writing access rights flag to on (step 51), and proceeds to the subsequent step. For example, the CPU 10 sets the writing access rights flag represented by the writing access rights flag data Df to on, and updates the writing access rights flag data Df. It should be noted that, if a plurality of posting conditions are set for the currently executed game application, a writing access rights flag may be set for each posting condition, and the writing access rights flag corresponding to the posting condition satisfied in the above step 51 may be set to on. Further, if the writing access rights flag is already set to on in the above step 51, the CPU 10 may proceed to the subsequent step as it is.

Next, the CPU 10 displays on the display apparatus a write button for writing on a bulletin board corresponding to the posting condition of the writing access rights flag currently set to on (step 52), and proceeds to the subsequent step. Here, the write button is an operation button, selected by the user to write on a bulletin board, for giving an instruction to write on the bulletin board. The selection of the write button results in presenting to the user the bulletin board on which to write. Then, the display of the write button on the display apparatus allows the user to know that they are allowed to write on a bulletin board, and the display of the write button also allows the user to know the type of the bulletin board on which they are allowed to write.

Next, the CPU 10 determines whether or not the user has chosen to write on the bulletin board (step 53). For example, if having determined, with reference to the operation data Da, that the user has performed the operation of selecting the write button displayed on the display apparatus, the CPU 10 determines that the user has chosen to write on the bulletin board. Then, if the user has chosen to write on the bulletin board, the CPU 10 proceeds to the subsequent step 54. If, on the other hand, the user has not chosen to write on the bulletin board, the CPU 10 ends the processing of this subroutine.

In step 54, the CPU 10 transmits a writing request to the bulletin board server 200, and proceeds to the subsequent step. For example, the CPU 10 transmits as a writing request step the user ID represented by the user ID data Db and the bulletin board ID represented by the bulletin board ID data De and corresponding to the bulletin board on which the user has chosen to write, to the bulletin board server 200 via the network 150. In response to the writing request, the bulletin board server 200 confirms with the authentication server 300 the authentication of the account corresponding to the user ID. Then, if login rights have been confirmed, the bulletin board server 200 sends a one-time URL as a response to the request to the transmission source (the game apparatus 3) having made the writing request.

Next, the CPU 10 waits for the response to the request from the bulletin board server 200 (step 55). If the CPU 10 has received the response to the request, the CPU 10 proceeds to the subsequent step 56.

In step 56, the CPU 10 starts a bulletin board application. Then, the CPU 10 performs a client authentication process with the bulletin board server 200 (step 57), and proceeds to the subsequent step. For example, the CPU 10 performs an SSL client authentication process with the bulletin board server 200. Then, if authenticity has been confirmed in the client authentication process with the game apparatus 3, the bulletin board server 200 generates bulletin board information (for example, an HTML page) on the bulletin board for which the writing request has been made by the game apparatus 3.

Next, the CPU 10 performs a bulletin board display process (step 58), and proceeds to the subsequent step. For example, the CPU 10 acquires the bulletin board information generated by the bulletin board server 200 via the network 150, and displays the bulletin board information (for example, an HTML page) on the display apparatus.

Next, the CPU 10 determines whether or not the user of the game apparatus 3 has posted on the currently displayed bulletin board (step 59). For example, if the user has input posting information using an input apparatus of the game apparatus 3 and performed the operation of writing the posting information on the bulletin board, the CPU 10 determines that the user has posted. Specifically, with reference to the operation data Da, in accordance with the user inputting posting information using the input apparatus, the CPU 10 stores the input posting information in the posting information data Dg. Then, if having determined, with reference to the operation data Da, that the user has performed the operation of posting the posting information, the CPU 10 determines that the user has posted. Then, if the user has posted, the CPU 10 proceeds to the subsequent step 60. If, on the other hand, the user has not posted, the CPU 10 proceeds to the subsequent step 61.

In step 60, the CPU 10 transmits the posting information input by the user to the bulletin board server 200, and proceeds to the subsequent step 61. For example, if the user has performed the operation of posting the posting information, the CPU 10 transmits the posting information represented by the posting information data Dg to the bulletin board server 200 via the network 150.

In step 61, the CPU 10 determines whether or not the process of browsing/posting on the currently displayed bulletin board is to be ended. Then, if the process of browsing/posting on the bulletin board is to be ended, the CPU 10 ends the processing of the subroutine. If, on the other hand, the process of browsing/posting on the bulletin board is to be continued, the CPU 10 returns to the above step 58 and continues the process thereof.

Referring back to FIG. 7, after the bulletin board writing process in the above step 46, the CPU 10 determines whether or not the game is to be ended (step 47). Examples of conditions for ending the game include: the satisfaction of the conditions under which the game is ended (for example, the game is over); and the fact that the user has performed the operation of ending the game. If the game is not to be ended, the CPU 10 returns to the above step 44, and repeats the process thereof. If the game is to be ended, the CPU 10 ends the processing indicated in the flow chart.

It should be noted that, in the flow chart described above, the example is used where the write button, indicating that it is allowed to write on a bulletin board related to the game, is displayed on the display apparatus during the game processing. Alternatively, the write button may be displayed after the game is ended. For example, if the write button is displayed on a title screen or the like after the game is ended, the user can know that this execution of the game has allowed them to write on a bulletin board related to the game. In this case, if the determination is affirmative in the above step 45, the CPU 10 performs only the above step 51, i.e., the process of setting the writing access rights flag to on, and then performs the processes of the above steps 52 through 61 after the determination is affirmative in the above step 47. The processing order may be thus changed, whereby the write button is displayed and it is allowed to post on a bulletin board related to the game, after the game is ended.

In FIG. 9, the control section 202 of the bulletin board server 200 waits for a writing request from the game apparatus 3 (step 71). If the control section 202 has received a writing request, the control section 202 proceeds to the subsequent step 72.

In step 72, if the control section 202 has received a writing request, the control section 202 inquires of the authentication server 300 about the authentication of the account corresponding to the user ID of the transmission source having transmitted the writing request. Then, the control section 202 confirms with the authentication server 300 the authentication of the account corresponding to the user ID. If login rights have been confirmed, the control section 202 generates a one-time URL for authenticating the client, sends the one-time URL to the transmission source having transmitted the writing request (step 72), and proceeds to the subsequent step.

Next, the control section 202 performs a client authentication process with the transmission source having transmitted the writing request (step 73), and proceeds to the subsequent step. For example, the control section 202 performs an SSL client authentication process with the transmission source, namely the game apparatus 3.

Next, if authenticity has been confirmed in the client authentication process with the transmission source, namely the game apparatus 3, the control section 202 sets and saves credentials for access of the transmission source having transmitted the writing request (step 74), and proceeds to the subsequent step. For example, using the user ID of the transmission source having transmitted the writing request and the bulletin board ID of the bulletin board for which the writing request has been made, the control section 202 sets, for the user ID, credentials for access to the bulletin board corresponding to the bulletin board ID, and updates the credentials-for-access data Dm.

Next, the control section 202 generates, on the bulletin board for which the writing request has been made by the game apparatus 3, bulletin board information (for example, an HTML page) to be disclosed to the request source, and updates the bulletin board information data Dp (step 75). Then, the control section 202 discloses the bulletin board information represented by the bulletin board information data Dp to the request source (the game apparatus 3) having made the writing request (step 76), and proceeds to the subsequent step.

Next, the control section 202 waits for the reception of posting information from the request source having made the writing request, and determines whether or not the control section 202 has received the posting information (step 77). Then, if the control section 202 has received the posting information, the control section 202 proceeds to the subsequent step 78. If, on the other hand, the control section 202 has not received the posting information, the control section 202 ends the processing indicated in the flow chart.

In step 78, using the received posting information, the control section 202 updates the bulletin board information of the bulletin board for which the writing request has been made. Then, using the bulletin board data Do of each of the bulletin boards managed by the bulletin board server 200 and the updated bulletin board information, the control section 202 updates the bulletin board information data Dp to be disclosed to the request source. Then, the control section 202 ends the processing indicated in the flow chart.

As described above, if a writing request for writing on a particular bulletin board has been made by the game apparatus 3, the bulletin board server 200 automatically sets and saves, for the user ID of the request source, credentials for access to the bulletin board. Then, the bulletin board server 200 permits the user having the credentials for access to post (write) on the bulletin board. Thus, only posters having satisfied a posting condition based on the execution state of an application executed by the game apparatus 3 are allowed to write posting information on a bulletin board regarding the application. This makes it possible to improve the reliability of the posting information.

Next, with reference to FIGS. 10 and 11, a description is given of an example of the process of browsing and/or posting on a bulletin board managed by the bulletin board server 200, using the game apparatus 3 or the terminal apparatus 100. It should be noted that this browsing/posting process can be performed using an apparatus such as the game apparatus 3 or the terminal apparatus 100 capable of logging in to the network 150 using a user ID. Here, to make the process specific, the following description is given using the processing performed between the game apparatus 3 and the bulletin board server 200.

In FIG. 10, the CPU 10 of the game apparatus 3 performs the process of logging in to the network 150 (step 80), and proceeds to the subsequent step. For example, the CPU 10 performs the process of logging in to the network 150 using the user ID represented by the user ID data Db and the password represented by the password data Dc. The authentication server 300 connected to the network 150 authenticates the account using the user ID and the password transmitted in the login process, and sends the authentication result to the transmission source (the game apparatus 3).

Next, the CPU 10 waits for the authentication result from the authentication server 300 (step 81). If login rights have been confirmed by the authentication of the account, the CPU 10 proceeds to the subsequent step 82.

In step 82, the CPU 10 starts a portal application. Then, on the basis of the started portal application, the CPU 10 transmits a bulletin board access request to the bulletin board server 200 (step 83), and proceeds to the subsequent step. For example, the CPU 10 transmits as the bulletin board access request the user ID represented by the user ID data Db to the bulletin board server 200 via the network 150. In response to the bulletin board access request, the bulletin board server 200 confirms with the authentication server 300 the authentication of the account corresponding to the user ID. Then, if login rights have been confirmed, the bulletin board server 200 generates bulletin board information (for example, an HTML page) that is allowed to be disclosed to the user having the user ID, and discloses the bulletin board information to the request source (the game apparatus 3 or the terminal apparatus 100) having made the bulletin board access request.

Next, the CPU 10 waits for the bulletin board information disclosed by the bulletin board server 200 (step 84). If the CPU 10 has received the bulletin board information, the CPU 10 proceeds to the subsequent step 85.

In step 85, the CPU 10 performs a bulletin board display process, and proceeds to the subsequent step. For example, the CPU 10 acquires the bulletin board information generated by the bulletin board server 200 via the network 150, and displays the bulletin board information (for example, an HTML page) on the display apparatus.

Next, the CPU 10 determines whether or not, in the bulletin board information received from the bulletin board server 200, there is any bulletin board on which it is allowed to post (step 86). Then, if there is any bulletin board on which it is allowed to post, the CPU 10 proceeds to the subsequent step 87. If, on the other hand, there is no bulletin board on which it is allowed to post, the CPU 10 proceeds to the subsequent step 89. For example, if there is any bulletin board on which it is allowed to post, the CPU 10 displays on the display apparatus of the game apparatus 3 a list showing posting-allowed bulletin boards, thereby indicating the presence of posting-allowed bulletin boards and the types of the bulletin boards to the user of the game apparatus 3.

In step 87, the CPU 10 determines whether or not the user of the game apparatus 3 has posted on a posting-allowed bulletin board. For example, if, using the input apparatus of the game apparatus 3, the user has selected from the above list a bulletin board on which to post, and input posting information to the selected bulletin board, and then performed the operation of writing the posting information on the bulletin board, the CPU 10 determines that the user has posted. Specifically, with reference to the operation data Da, in accordance with the user inputting posting information using the input apparatus, the CPU 10 stores the input posting information in the posting information data Dg. Then, if having determined, with reference to the operation data Da, that the user has performed the operation of posting the posting information, the CPU 10 determines that the user has posted. Then, if the user has posted, the CPU 10 proceeds to the subsequent step 88. If, on the other hand, the user has not posted, the CPU 10 proceeds to the subsequent step 89.

In step 88, the CPU 10 transmits the posting information input by the user to the bulletin board server 200, and proceeds to the subsequent step 89. For example, if the user has performed the operation of posting the posting information, the CPU 10 transmits the posting information represented by the posting information data Dg to the bulletin board server 200 via the network 150.

In step 89, the CPU 10 determines whether or not the process of browsing/posting on the currently displayed bulletin board is to be ended. Then, if the process of browsing/posting on the bulletin board is to be ended, the CPU 10 ends the processing indicated in the flow chart. If, on the other hand, the process of browsing/posting on the bulletin board is to be continued, the CPU 10 returns to the above step 84 and continues the process thereof.

In FIG. 11, the control section 202 of the bulletin board server 200 waits for a bulletin board access request from the game apparatus 3 (step 90). If the control section 202 has received a bulletin board access request, the control section 202 proceeds to the subsequent step 91.

In step 91, the control section 202 inquires of the authentication server 300 about the authentication of the account corresponding to the user ID of the transmission source having transmitted the bulletin board access request. Then, the control section 202 confirms with the authentication server 300 the authentication of the account corresponding to the user ID. If login rights have been confirmed, the control section 202 confirms credentials for access of the transmission source having transmitted the bulletin board access request. For example, with reference to the credentials-for-access data Dm, the control section 202 confirms the presence or absence of any bulletin board to which the user ID has credentials for access. Then, if there is any bulletin board to which the user ID has credentials for access, the control section 202 proceeds to the subsequent step 92. If, on the other hand, there is no bulletin board to which the user ID has credentials for access, the control section 202 proceeds to the subsequent step 93.

In step 92, the control section 202 creates a list of bulletin boards on which the transmission source having transmitted the bulletin board access request is allowed to post (a posting-allowed bulletin board list), and proceeds to the subsequent step 93. For example, the control section 202 extracts bulletin boards to which credentials for access are set for the transmission source in the credentials-for-access data Dm, thereby creating a posting-allowed bulletin board list showing the extracted bulletin boards as posting-allowed bulletin boards.

In step 93, the control section 202 determines whether or not there is any result of the posting of a particular user regarding the user of the transmission source. For example, with reference to the particular user data Dn, the control section 202 determines whether or not a particular user associated with the user ID of the user of the transmission source is registered. Then, if there is any result of the posting of the particular user, the control section 202 proceeds to the subsequent step 94. If, on the other hand, there is no such result of the posting of a particular user, the control section 202 proceeds to the subsequent step 95.

In step 94, the control section 202 creates a list showing the contents of the postings made by the particular user on bulletin boards (a particular posting content list), and proceeds to the subsequent step 95. For example, the control section 202 extracts from the bulletin board data Do the contents of the postings made by the particular user represented by the particular user data Dn, thereby creating a particular posting content list showing the contents of the postings made by the particular user. It should be noted that the particular posting content list in the above step 94 may be created by extracting only the contents of the postings made by the particular user on the bulletin boards to which the user of the transmission source has credentials for access.

It should be noted that the particular user may be managed by another apparatus (server) capable of communicating via the network 150, or by the apparatus of the transmission source itself. As an example, a user representing a friend associated with the user of the transmission source by the approval of each other may be managed by a dedicated server that manages the relationship between these friends. In this case, in the above step 93, the control section 202 inquires of the other apparatus managing the particular user about the presence or absence of a particular user associated with the user ID of the transmission source and the user ID of the particular user. If the particular user is managed, the control section 202 acquires the user ID representing the particular user. Then, in the above step 94, the control section 202 extracts from the bulletin board data Do the contents of the postings made by the particular user, together with the user ID of the particular user acquired by inquiring of the other apparatus, thereby creating a particular posting content list showing the contents of the postings made by the particular user.

In step 95, the control section 202 creates a list of bulletin boards that the user of the transmission source having transmitted the bulletin board access request is allowed to browse (a browsing-allowed bulletin board list), and proceeds to the subsequent step. For example, the control section 202 creates a browsing-allowed bulletin board list on the basis of a disclosure condition under which browsing is allowed in response to the bulletin board access request. As a first example of the disclosure condition, it is allowed to browse, as well as the contents of the postings of the particular user described above, the contents of the postings (the posting sources are optional) on bulletin boards to which the user of the transmission source has credentials for access. As a second example of the disclosure condition, it is allowed to browse the contents of the postings (the posting sources are optional) on all the bulletin boards managed by the bulletin board server 200. In this case, consequently, it is allowed to browse all the contents of the postings represented by the bulletin board data Do, and therefore, it is not necessary to perform the processes of the above steps 93 and 94. As a third example of the disclosure condition, it is allowed to browse only the contents of the postings (the posting sources are optional) on bulletin boards to which the user of the transmission source has credentials for access. In this case, it is not possible to browse even the contents of the postings of the particular user if the postings have been made on bulletin boards to which the user of the transmission source has no credentials for access, and therefore, it is not necessary to perform the processes of the above steps 93 and 94. It should be noted that, in the first example of the disclosure condition and the third example of the disclosure condition, the posting condition in the above step 45 serves not only as a condition under which it is allowed to post on a bulletin board, but also as a condition under which it is permitted to browse the bulletin board.

Next, the control section 202 presents, to the transmission source having transmitted the bulletin board access request, the bulletin boards that the transmission source is allowed to browse and/or post on, generates bulletin board information (for example, an HTML page) to be disclosed to the transmission source, and updates the bulletin board information data Dp (step 96). Then, the control section 202 discloses the bulletin board information represented by the bulletin board information data Dp to the transmission source (the game apparatus 3 or the terminal apparatus 100) having transmitted the bulletin board access request (step 97), and proceeds to the subsequent step.

Next, the control section 202 waits for the reception of posting information from the transmission source having transmitted the bulletin board access request, and determines whether or not the control section 202 has received the posting information (step 98). Then, if the control section 202 has received the posting information, the control section 202 proceeds to the subsequent step 99. If, on the other hand, the control section 202 has not received the posting information, the control section 202 ends the processing indicated in the flow chart.

In step 99, using the received posting information, the control section 202 updates the bulletin board information of the bulletin board on which the posting has been made. Then, using the bulletin board data Do of each of the bulletin boards managed by the bulletin board server 200 and the updated bulletin board information, the control section 202 updates the bulletin board information data Dp to be disclosed to the transmission source having transmitted the bulletin board access request. Then, the control section 202 ends the processing indicated in the flow chart.

As described above, the bulletin board server 200 prohibits a user having no credentials for access to a bulletin board from writing on the bulletin board. If, however, a user has once made a writing request using the game apparatus 3 and credentials for access have been set for the user, the bulletin board server 200 allows the user to write on the bulletin board to which the user has the credentials for access. Further, once the credentials for access to the bulletin board have been registered, the user is allowed to write on the bulletin board even using another apparatus.

Further, in the information processing system 1, the piece of identification information of a bulletin board on the basis of which it is allowed to write in the bulletin board server 200 is held in advance by the game apparatus 3. Then, only the game apparatus 3 manages the piece of identification information, whereby it is allowed to write on the bulletin board only when the game apparatus 3 permits posting, and another apparatus, which does not manage the piece of identification information, cannot allow writing on the bulletin board. That is, the bulletin board server 200 does not need to determine whether or not it is allowed to post, and it is possible to manage, only with the design of an application to be executed by the game apparatus 3, whether or not it is allowed to post. This makes it possible to design an application to be executed by the game apparatus 3, without taking into account the settings of the bulletin board server 200, which makes it possible to improve the degree of freedom in design. Further, it is also possible to set a plurality of bulletin boards on which it is allowed to post, by setting a plurality of pieces of identification information as described above for one application to be executed by the game apparatus 3, which makes it possible to further improve the degree of freedom in designing the application.

It should be noted that, if the effect of improving the degree of freedom in designing an application to be executed by the game apparatus 3 is not desired, the bulletin board server 200 may perform some of the processing performed by the game apparatus 3 described above. For example, the bulletin board server 200 may perform the process of determining whether or not the state of the execution of an application has satisfied a predetermined condition (for example, the process of step 45), and may perform the process of, if the above state has satisfied the predetermined condition, permitting a user to write in information (a bulletin board) managed by the bulletin board server 200 (for example, the processes of steps 51 and 52). Specifically, the game apparatus 3 may sequentially transmit the state of the game processing performed in step 44 to the bulletin board server 200, whereby the bulletin board server 200 can perform the process of step 45. Further, the bulletin board server 200 may manage the writing access rights flag used in step 51, and when performing step 52, the bulletin board server 200 may transmit to the game apparatus 3 an instruction to display the write button. This makes it possible to notify the user of the game apparatus 3 that it is allowed to write.

In addition, in the processing described above, the example is used where, when writing is performed on a bulletin board managed by the bulletin board server 200, the apparatus of the posting source transmits posting information and the user ID to the bulletin board server 200. Also in this example, the posting process is performed on the assumption that the application regarding which the posting is to be made is executed until the user of the posting source satisfies the posting condition. Thus, the transmission of the posting information results in indicating to the bulletin board server 200 that the posting source is in an execution state that satisfies the posting condition.

When, however, writing is performed on a bulletin board managed by the bulletin board server 200, the apparatus of the posting source may transmit information indicating, as well as the posting information and the user ID, the degree of execution of the application regarding which the posting is to be made. For example, if a game is executed, examples of the degree of execution may include: the number of times the game has been completed; the game playing time; the number of times the game has been played; the number of enemies appearing in the game that have been defeated; the type of an enemy appearing in the game; the type of a predetermined event that has occurred during the game; the number of times the user has won or lost in the game; and the number of times the game has been actually executed. Alternatively, if the process of reproducing a moving image is executed, examples of the degree of execution may include: the number of times the moving image has been reproduced to the end; the reproduction time of the moving image; and the number of times the moving image has been actually reproduced. Yet alternatively, if the process of displaying a still image (an electronic book, a cooking recipe, or the like) is executed, examples of the degree of execution may include: the number of pages of displayed still images; the type of a displayed still image; and the number of times the still image has been actually displayed. In this case, on the basis of data representing the degree of execution and transmitted from the posting source, the bulletin board server 200 can write posting information together with the degree of execution transmitted with the posting information, on a bulletin board for disclosure. Thus, not only does the information posted on the bulletin board ensure that the posting condition is satisfied, the information also indicates the degree of execution exceeding the posting condition. This further enhances the credibility of posting information.

In addition, the above descriptions are given using the example where the game apparatus 3, the terminal apparatus 100, and the bulletin board server 200 perform the information processing. Alternatively, another apparatus may perform at least some of the processing steps in the information processing. For example, if the game apparatus 3 is further configured to communicate with another apparatus (for example, another server, another game apparatus, or another mobile terminal), the other apparatus may cooperate to perform the processing steps of the information processing. As an example, the other apparatus may perform the process of determining whether or not a posting condition has been satisfied, and the game apparatus 3 may transmit data regarding the execution state of an application to the other apparatus, whereby the information processing is performed. Then, the result of the determination made by the other apparatus may be transmitted to the game apparatus 3, and the following processes may be performed on the basis of the determination result. Another apparatus may thus perform at least some of the processing steps in the information processing, which enables information processing similar to that described above. Further, the information processing described above can be performed by a processor or the cooperation of a plurality of processors, the processor and the plurality of processors contained in an information processing system including at least one information processing apparatus. Further, in the exemplary embodiment, the processing indicated in the flow chart described above is performed as a result of the CPU 10 of the game apparatus 3 and the control section 202 of the bulletin board server 200 executing a predetermined program. Alternatively, some or all of the processing indicated in the flow chart may be performed by a dedicated circuit included in the game apparatus 3 and a dedicated circuit included in the bulletin board server 200.

Further, the processing orders, the setting values, the conditions used in the determinations, and the like that are used in the information processing described above are merely illustrative. Thus, it is needless to say that the exemplary embodiment can be achieved also with other orders, other values, and other conditions.

In addition, the information processing program may be supplied to the game apparatus 3 not only through an external storage medium such as the optical disk 4, but also through a wired or wireless communication link. Further, the information processing program may be stored in advance in a non-volatile storage device included in the game apparatus 3. It should be noted that examples of an information storage medium having stored therein the information processing program may include CD-ROMs, DVDs, optical disk storage media similar to these, flexible disks, hard disks, magneto-optical disks, and magnetic tapes. Alternatively, an information storage medium having stored therein the information processing program may be a non-volatile semiconductor memory or a volatile memory. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It is needless to say that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

An information processing system, a storage medium having stored therein an information processing program, an information processing apparatus, and an information processing method according to the exemplary embodiment can improve the credibility of information written in a server, and are useful as an information processing system, an information processing program, an information processing apparatus, an information processing method, and the like that perform the process of writing on a bulletin board service and the like.

What is claimed is:

1. An information processing system including a server and at least one apparatus capable of communicating with the server,
   the apparatus comprising a first processing system including at least one processor and configured to execute a predetermined application,
   the server comprising a second processing system including at least one processor,
   wherein the first processing system is configured to perform operations comprising:
      determining whether or not a degree of the execution of the predetermined application by a user has satisfied a predetermined condition;
      when the degree of execution has satisfied the predetermined condition, permitting the user of the apparatus to write new posting information in user posting information managed by the server; and
      when the degree of execution has not satisfied the predetermined condition, preventing the user from writing new posting information in said user posting information managed by the server, and
   wherein the second processing system is configured to perform operations comprising, when new posting information is received from the apparatus, update the user posting information managed by the server, using the received new posting information.

2. The information processing system according to claim 1, wherein
   the first processing system is further configured to, when the writing is permitted by said permitting, transmit input information input by the permitted user to the server, and
   the second processing system is further configured to, when having received the input information from the apparatus, perform said updating the user posting information managed by the server, using the received input information.

3. The information processing system according to claim 2, wherein the first processing system is further configured to:
   manage at least one piece of identification information of the server;
   when the degree of execution has satisfied the predetermined condition according to the determining, permit the user to write in the user posting information corresponding to the piece of identification information; and
   when the user has been permitted to write in the user posting information managed by the server, transmit the input information input by the user to the server, using the piece of identification information.

4. The information processing system according to claim 3, wherein
   the application holds the piece of identification information for writing new posting information regarding the application in the user posting information managed by the server, and
   the first processing system is further configured to manage the piece of identification information held by the application.

5. The information processing system according to claim 3, wherein
   the server provides as the user posting information a plurality of services on which to write,
   wherein the first processing system is further configured to manage the pieces of identification information corresponding to the respective services,
   determine whether or not the degree of execution has satisfied each of a plurality of conditions,
   permit the user to write in the service corresponding to the condition satisfied by the degree of execution,
   transmit the input information to the server, using the piece of identification information corresponding to the service on which the user has been permitted to write, and wherein the second processing system is further configured to
   update the user posting information of the service corresponding to the piece of identification information related to the input information, using the input information received from the apparatus.

6. The information processing system according to claim 2, wherein
   the first processing system is further configured to manage a unique code for identifying the user who uses the apparatus,
   when the degree of execution has satisfied the predetermined condition, the first processing system permits the user having satisfied the predetermined condition to write in the information using the code,
   when the writing has been permitted, the first processing system transmits the code to the server,
   the second processing system is configured to manage, using the code, a user to be permitted to write in the user posting information, and
   when the second processing system has received the code from the apparatus or another apparatus and the received code is included in the managed codes, second processing system updates the user posting information managed by the server, using the input information input by the user identified by the received code.

7. The information processing system according to claim 1, wherein
   the first processing system is further configured to determine whether or not the degree of execution has satisfied the predetermined condition when the application is executing, and, when having determined that the degree of execution has satisfied the predetermined condition, saves determination data representing the determination result, and
   when the determination data has been saved at a predetermined time, permit the user of the apparatus to write in the user posting information managed by the server.

8. The information processing system according to claim 7, wherein
   the first processing system is further configured to notify the user of the apparatus that the writing has been permitted at the predetermined time.

9. The information processing system according to claim 2, wherein
the server provides as the user posting information a plurality of services on which to write, wherein the first processing system is further configured to:
manage a plurality of pieces of identification information corresponding to the respective services of the server;
manage a unique code for identifying the user who uses the apparatus;
determine whether or not the degree of execution has satisfied each of a plurality of conditions;
permit, in the service corresponding to the condition satisfied by the degree of execution, the user having satisfied the condition to write using the code; and
when the writing has been permitted, transmit to the server the piece of identification information corresponding to the service on which the user has been permitted to write and the code,
and wherein the second processing system is further configured to: when having received the piece of identification information and the code, manage, using the received code, a user to be permitted to write in each of the services, such that the user identified by the received code is the user to be permitted to write in the service corresponding to the received piece of identification information; and
when the code is received from the apparatus or another apparatus and the received code is included in the managed codes, update the user posting information of the service, using the input information input to write in the service by the user identified by the received code.

10. The information processing system according to claim 1, wherein
the second processing system is further configured to disclose, to the user permitted by the first processing system to write, the user posting information in which the user has been permitted to write.

11. The information processing system according to claim 1, further configured to manage a particular user having a particular relationship with the user, wherein
the second processing system is further configured to, when a request has been made for disclosure of the information managed by the server, disclose, to the user having made the request, input information written by the particular user set for the user having made the request.

12. The information processing system according to claim 2, wherein
the first processing system is further configured to transmit to the server the input information together with degree of execution information indicating the degree of execution of the execution, and
when having received the input information from the apparatus, the second processing system updates the managed information, using both the input information and the degree of execution information, and adds both the input information and the degree of execution information to information to be disclosed to the apparatus and another apparatus.

13. The information processing system according to claim 6, wherein
the other apparatus includes an apparatus of the same type as the apparatus having executed the application, and also includes an apparatus of a different type from the apparatus having executed the application.

14. The information processing system according to claim 1, further configured to, using a character string for identifying the user and a password input by the user, authenticate an account for communicating with the server, wherein
when the degree of execution of the execution of the application performed by the user for which the account is authenticated has satisfied the predetermined condition, the writing management unit permits the user to write.

15. The information processing system according to claim 1, wherein the first processing system is further configured to:
execute a game application, and
when a predetermined game has been completed in the executed game application, determine that the degree of execution has satisfied the predetermined condition.

16. A non-transitory computer-readable storage medium having stored therein an information processing program to be executed by a computer contained in an information processing system including a server and at least one apparatus capable of communicating with the server, the information processing program causing the at least one apparatus to perform operations comprising:
executing a predetermined application;
determining whether or not a degree of the execution of the predetermined application by a user has satisfied a predetermined condition;
when the degree of execution has satisfied the predetermined condition, permitting the user of the apparatus to write new posting information in user posting information managed by the server; and
when the degree of execution has not satisfied the predetermined condition, preventing the user from writing new posting information in said user posting information managed by the server,
and wherein the server performs operations comprising, when new posting information is received from the apparatus, update the user posting information managed by the server, using the received new posting information.

17. An information processing apparatus capable of communicating with a server, the information processing apparatus comprising a processing system including at least one processor, wherein the processing system is configured to perform operations comprising:
executing a predetermined application;
determining whether or not a degree of the execution performed by the application execution unit has satisfied a predetermined condition;
when the degree of execution has satisfied the predetermined condition, permitting a user of the information processing apparatus to write new posting information in user posting information managed by the server; and
when the degree of execution has not satisfied the predetermined condition, preventing the user from writing new posting information in said user posting information managed by the server,
and wherein the server is configured to perform operations comprising, when new posting information is received from the apparatus, update the user posting information managed by the server, using the received new posting information.

18. An information processing method to be executed by a processor or a cooperation of a plurality of processors, the processor and the plurality of processors contained in an information processing system including a server and at least one apparatus capable of communicating with the server, the information processing method executed by the at least one apparatus comprising:
- executing a predetermined application;
- determining whether or not a degree of the execution by a user has satisfied a predetermined condition;
- when the degree of execution has satisfied the predetermined condition, permitting the user of the apparatus to write new posting information in user posting information managed by the server; and
- when the degree of execution has not satisfied the predetermined condition, preventing the user from writing new posting information in said user posting information managed by the server,
- and wherein the server, when new posting information is received from the apparatus, updates the user posting information managed by the server, using the received new posting information.

19. The information processing system of claim 1, wherein the degree of execution includes at least one of a number of times the predetermined application is executed by the user, a number of times the predetermined application is executed to completion by the user, a number of times the user achieved a particular result in the predetermined application, a time used by the user for executing the predetermined application, and progress made by the user towards successfully completing the predetermined application.

* * * * *